United States Patent [19]

Chieh-Tsung

[11] 4,147,158
[45] Apr. 3, 1979

[54] MULTI-LAYERED SOLAR ENERGY COLLECTOR

[75] Inventor: Chang Chieh-Tsung, No. 6, Ping-An Rd., Chao-Chou Chen, Ping-Tong Hsien, Taiwan

[73] Assignee: Chang Chieh-Tsung, Taiwan

[21] Appl. No.: 811,272

[22] Filed: Jun. 29, 1977

[30] Foreign Application Priority Data

May 24, 1977 [TW] Taiwan ................................ 6610927

[51] Int. Cl.² ............................................... F24J 3/02
[52] U.S. Cl. ..................................... 126/271; 350/299
[58] Field of Search ................ 126/270, 271; 350/293, 350/294, 299

[56] References Cited

U.S. PATENT DOCUMENTS

| 895,761 | 8/1908 | Huntoon | 126/271 |
| 3,310,102 | 3/1967 | Trombe | 126/270 |
| 3,964,464 | 6/1976 | Hockman | 126/271 |

*Primary Examiner*—Kenneth W. Sprague
*Attorney, Agent, or Firm*—Robert E. Burns; Emmanuel J. Lobato; Bruce L. Adams

[57] ABSTRACT

A multi-layered solar energy collector comprising a supporting means and a plurality of collector layers structured as part of coaxial cylinders or part of concentric spheres secured to said means whereby to absorb and utilize both the direct and scattering radiation of the sunlight to produce a high temperature thermal energy output.

4 Claims, 7 Drawing Figures

MULTI-LAYERED SOLAR ENERGY COLLECTOR

BACKGROUND OF THE INVENTION

1. Field of the Invention

The present invention relates to a Multi-layered solar energy collector.

2. Brief Description of the Prior Art

The solar energy is one of the most important energy sources and an ideal one for there is no danger of using out thereof. Besides, it is clean causing no pollution, without noise and low in cost of producing an unit energy.

The conventional solar energy collectors utilize the photo-electric effect of semiconductors to convert solar energy directly into electric energy. However, most of the collectors convert the solar energy into thermal one first for transferring to a power plant where said thermal energy are utilized to generate electric power.

Several types of collectors to convert solar energy into thermal one have been developed, such as a focusing typed collector, plane type collector, etc. The former has a larger focusing rate to obtain a high temperature output. But one of the disadvantages to this type of collector resides in not having the ability to catch the scattering radiation of the sun's ray. Therefore this type of collector must always be equipped with a tracking mechanism to constantly face the collector toward the sun. The plane type collector can utilize both the direct and scattering radiation of the ray without having a tracking means. But the output of thermal energy is extremely restricted to the temperature thereof, say at most 100° C.

BRIEF SUMMARY OF THE INVENTION

The Primary object of the present invention is to obviate the disadvantages of the conventional collectors by providing a multi-layed solar energy collector which can utilize the direct and scattering radiation of the sunlight and produce a high temperature thermal energy output.

The collector according to the present invention has a plurality of collector layers structured as part of coaxial cylinders or part of concentric spheres. Each collector layer has a reflection centripetal face and a heat absorbing face to enhance the thermal convertion rate.

BRIEF DESCRIPTION OF THE DRAWINGS

Those and other objects and advantages will become apparent from the following detailed description of the preferred embodiment with reference to the accompany drawings, wherein.

DETAILED DESCRIPTION OF THE PREFERRED EMBODIMENT

Figure 1:
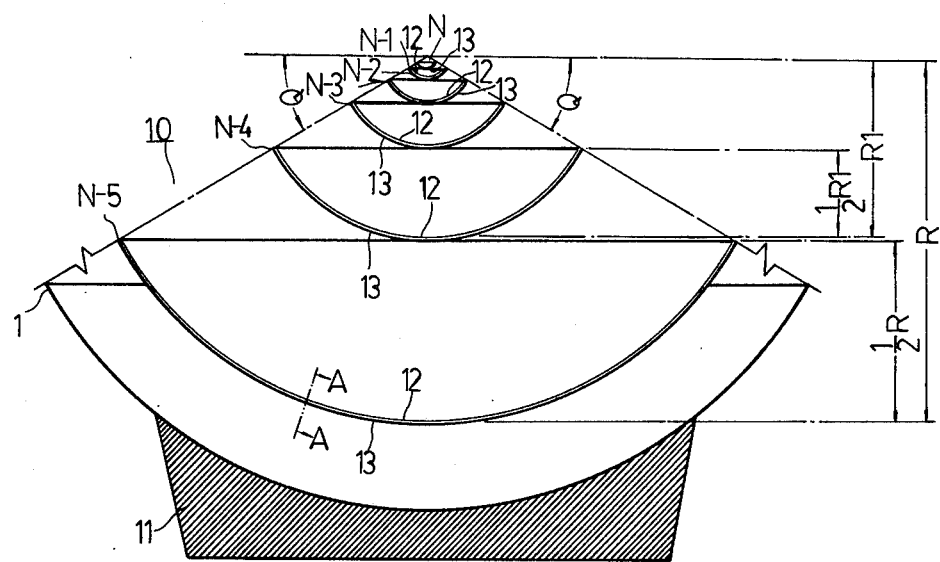
FIG. 1 is a schematic sectional elevation of the collector according to the present invention showing the collector layers as part of concentric spheres.

Referring to FIG. 1 wherein is shown a schematic sectional elevation of a collector according to the present invention and wherein a collector 10 has a supporting means 11 and a plurality of concentric collector layers numbered from 1 to N secured to the supporting means 11. It is to be noted that layers number 2 to N−6 have been omitted for an easier and better description to the structure thereof. Each collector layer has a reflection centripetal face 12 and a heat absorbing face 13 except the layer number 1 has only the former while the layer number N has only the later. The relative position of the layers is also shown in FIG. 1 by taking layers number N−5, N−4 and N−3 as an example. The reflection face 12 of the layer N−5 is part of a sphere having a radius R. Then the heat absorbing face 13 of the layer N−4 must be positioned at a distance of ½R which happens to be the focus length of the reflection face 12 of the layer N−5. On the same condition, the heat absorbing face 13 of the layer N−3 is positioned at a distance of ½R1 which is the focus length of the reflection face 12 of the layer N−4. The collector layers are not half spheres but so designed like a cone to have an angle Q with respect to the horizontal surface for allowing much more rays of light to be incident upon the reflection faces 12. The angle Q is best at 30° in practice.

Figure 2:
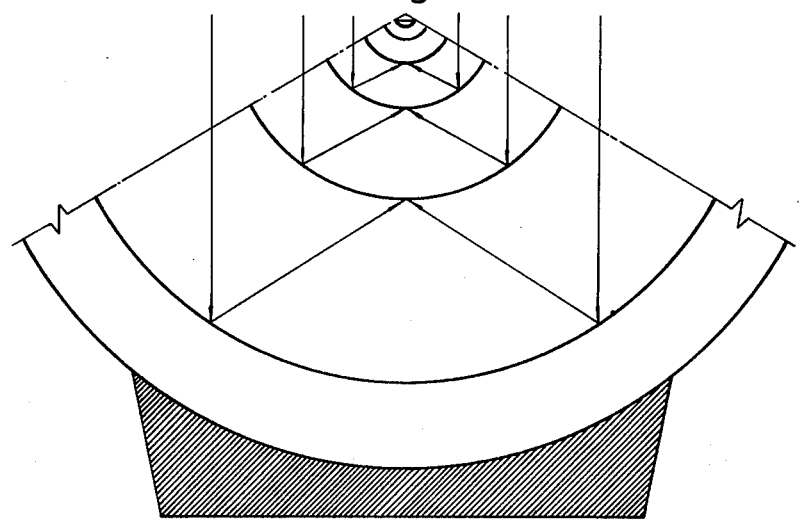
FIG. 2 is a schematic diagram of the collector showing the normally incident rays and the reflection thereof.
Figure 3:
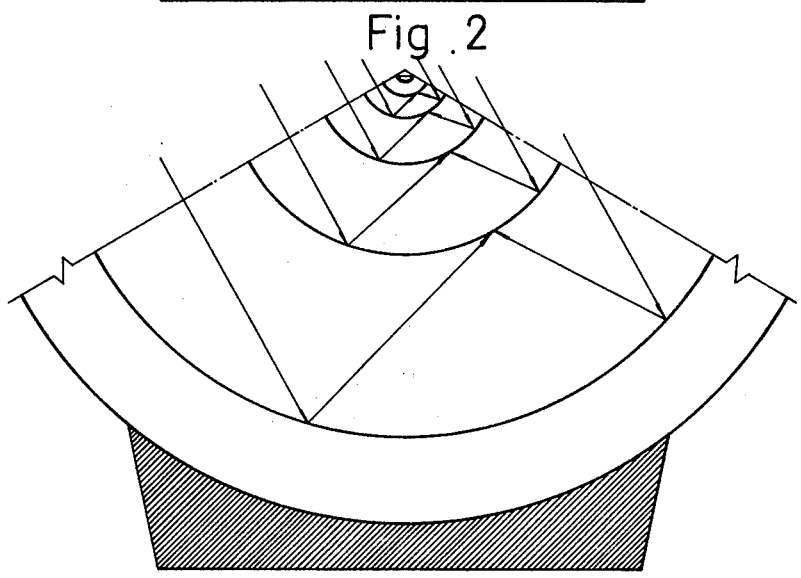
FIG. 3 is a schematic diagram of the collector showing the rays with a certain fixed incident angle and the reflection thereof.
Figure 4:
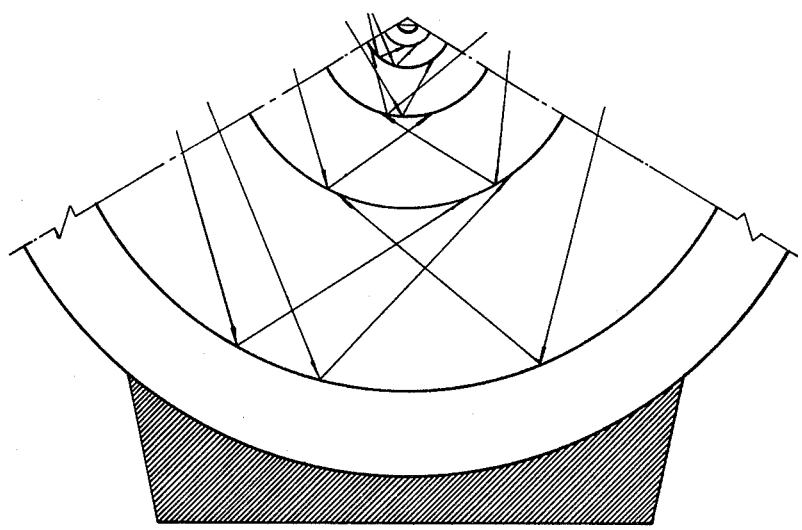
FIG. 4 is a schematic diagram of the collector showing the rays with irregular incident angles and the reflection thereof.

Referring to FIGS. 2 to 4, which show the schematic diagrams of the collector with rays of different incident angles it is to be noted that the characteristic features of the present solar energy collector reside in that all the incident rays are reflected by the reflection faces and the heat content therein is absorbed by the heat absorbing faces at a distance just equal to the focus of the reflection faces. Turning to FIG. 3, the rays are incident parallel at a certain angle with respect to the vertical normal line and they reflect to the heat absorbing faces and are absorbed thereon. FIG. 4 shows the scattering rays are incident to the collector at various incident angles, and all of them are reflected by the reflection faces to be focused on the heat absorbing faces thus be absorbed thereon. Said reflection and heat absorption contribute the solar energy collector according to the present invention having a greater thermal absorption rate than the conventional ones.

Figure 5:
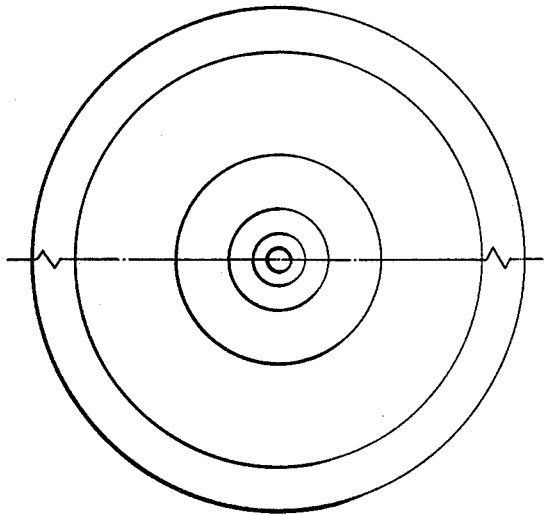
FIG. 5 is a schematic top view of the collector according to the present invention in FIG. 1.
Figure 6:
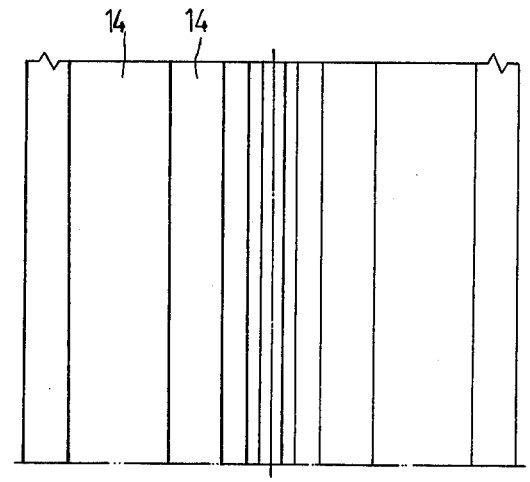
FIG. 6 is a schematic top view of the collector according to another embodiment of the present invention showing the collector layers as part of coaxial cylinders.

FIG. 5 shows a schematic top view of the collector according to the present invention. And FIG. 6 shows a schematic top view of the collector according to another embodiment of the present invention showing that the collector layers 14 are part of coaxial cylinders.

Figure 7:
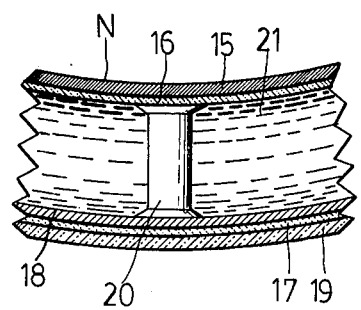
FIG. 7 is a sectional view taken along line A—A in FIG. 1 of the collector layer in the solar energy collector according to the present invention showing the construction thereof.

The structure of the collector layers is better described by reference to FIG. 7 which is a sectional view taken along section line A—A of the layer N−5 in FIG. 1. The layer N comprises a smooth reflection face 15, a heat-insulation 16 beneath the reflection face 15 with low expansion coefficient and made of pressure and corrosion resistive materials, a ruffed, black heat absorbing face 17 with a heat conductor 18 formed thereon, a transparent heat insulator 19 secured to the heat absorbing face 17, and a supporter 20 supported between said heat-insulator 16 and heat conductor 18.

Both the heat insulator 16 and the transparent heat insulator 19 function to obviate the heat loss. A liquid functioning as a thermal carrier 21 having high thermal conductivity is filled within the chamber between said insulators 16 and 19 to transport the collected heat energy to a power plant or the like.

The characteristics features of the present invention are compared to the conventional collectors in Table I.

Table I

| Type of Collector | Characteristic Features | Disadvantages or Limitations |
|---|---|---|
| Plane type | 1. Direct and scattering radiation of the rays are utilized. <br> 2. Low cost in equipment. <br> 3. No need of tracing means. | 1. Temperature of output thermal energy is limited below 100° C. |
| Focusing Type | 1. Larger focusing rate <br> 2. High Temperature in output thermal energy. | 1. Less quantity in output. <br> 2. High cost in equipment. <br> 3. Scattering Radiation of the rays is not utilized. |
| Multi-layered Type | 1. Direct and scattering radiation of the rays are utilized. <br> 2. Largest thermal absorbing area. <br> 3. Low cost in equipment. <br> 4. Structure is simple; no need of tracing means. <br> 5. Large quantity of output. <br> 6. Absorption rate is higher than the plane type even without direct sunlight. | 1. Temperature upon unitarea is lower than that of the focusing type. |

What I claim is:

1. A multi-layered solar energy collector assembly comprising, a plurality of concentric curved heat collectors arranged in an assembly radially spaced from each other in a vertical direction, all of the reflectors except an uppermost collector each having a convex centripetal reflector face for receiving light rays incident thereon, and each having a convex heat-absorbing face confronting the convex centripetal reflector face of the next adjacent collector to receive and absorb scattered reflected light rays therefrom, each reflector face and the corresponding heat-absorbing face to which it reflects light rays being spaced half the distance of the radius of the reflector face next adjacent and confronting the related heat-absorbing face, and means maintaining the collectors spaced concentrically.

2. A multi-layed solar energy collector assembly according to claim 1, in which said collectors are hemispherical in configuration.

3. A multi-layered solar energy collector assembly according to claim 1, in which said collectors are coaxial cylinders.

4. A multi-layered solar energy collector assembly according to claim 1, in which each collector has the reflector face and heat-absorbing face spaced from each other defining a space in which a fluid medium is received and circulated therein for absorbing heat and for transporting the absorbed heat elsewhere.

* * * * *